United States Patent [19]

Uchida et al.

[11] Patent Number: 5,228,055
[45] Date of Patent: Jul. 13, 1993

[54] SPREAD SPECTRUM COMMUNICATION DEVICE

[75] Inventors: Yoshitaka Uchida; Mamoru Endo; Masahiro Hamatsu; Shigeo Akazawa, all of Tokyo, Japan

[73] Assignee: Clarion Co., Ltd., Tokyo, Japan

[21] Appl. No.: 829,469

[22] Filed: Jan. 31, 1992

[30] Foreign Application Priority Data

| Jan. 31, 1991 | [JP] | Japan | 3-031631 |
| Feb. 15, 1991 | [JP] | Japan | 3-042803 |
| Jun. 26, 1991 | [JP] | Japan | 3-180432 |

[51] Int. Cl.$^5$ .......................................... H04K 1/10
[52] U.S. Cl. ......................................... 375/1; 380/31
[58] Field of Search .................. 375/1; 380/41, 31, 33

[56] References Cited

U.S. PATENT DOCUMENTS

| 3,204,034 | 8/1965 | Ballard et al. | 375/1 |
| 4,164,628 | 8/1979 | Ward et al. | 375/1 |
| 4,308,617 | 12/1981 | German, Jr. | 375/1 |
| 4,494,238 | 1/1985 | Groth, Jr. | 375/1 |
| 4,538,281 | 8/1985 | Rajan | 375/1 |
| 4,930,140 | 5/1990 | Cripps et al. | 375/1 |
| 5,005,169 | 4/1991 | Bronder et al. | 375/1 X |
| 5,063,571 | 11/1991 | Vancraeynest | 375/1 |
| 5,086,467 | 2/1992 | Makk | 380/33 |
| 5,138,632 | 8/1992 | Uchida | 375/1 |
| 5,144,641 | 9/1992 | Akazawa et al. | 375/1 |

Primary Examiner—Gilberto Barrón, Jr.
Attorney, Agent, or Firm—Flynn, Thiel, Boutell & Tanis

[57] ABSTRACT

On the transmitter side of a spread spectrum communication device according to the present invention, transmission date are converted into a plurality of parallel data sets by a serial-parallel convertor and spread-spectrum-modulation is effected by means of PN code generators and selectors. Different modulated outputs are delayed by delay devices, using a sounder channel and the phase thereof as a reference. The delayed outputs and the output of the sounder channel are added by an adder, multiplexed and transmitted.

On the receiver side correlation of a received signal with a reference signal is formed by a correlator and a correlation pulse is obtained from the correlation output. Data are reproduced by means of a sounder detecting circuit, a sampling pulse generating circuit and an information detecting circuit.

In this way data reproduction can be effected with a high efficiency by means of a single correlator.

9 Claims, 18 Drawing Sheets

TRANSMITTER

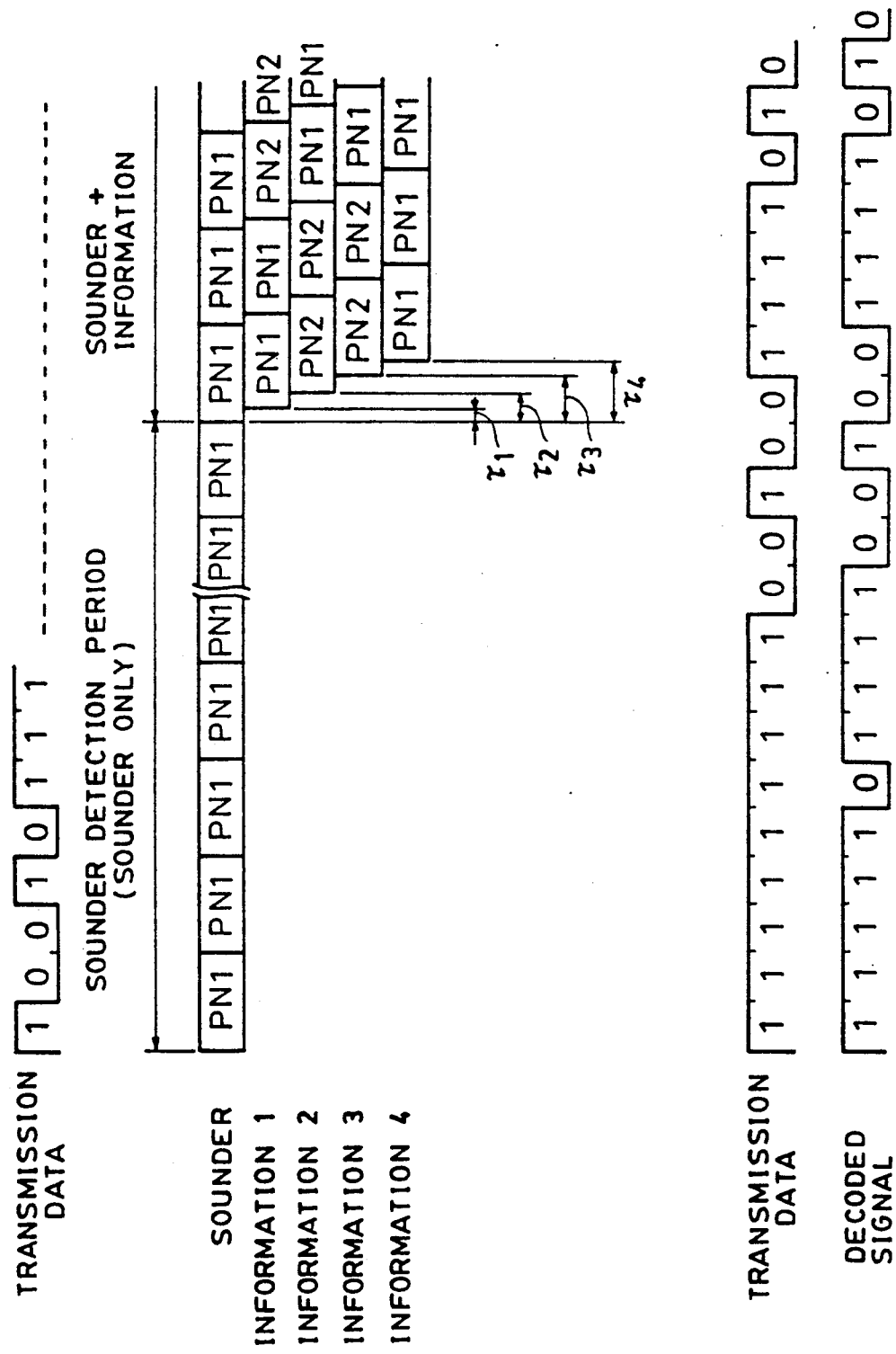

SPREAD SPECTRUM COMMUNICATION DEVICE

FIELD OF THE INVENTION

The present invention relates to a spread spectrum communication device and in particular to an improvement for making it possible to reproduce data by using a single correlator in a spread spectrum communication receiver.

BACKGROUND OF THE INVENTION

An example of a multiplex communication device by a prior art spread spectrum communication system carrying out high speed data communication is indicated in FIGS. 6 and 7.

FIG. 6 represents a transmitter, in which reference numeral 1 is a serial-parallel convertor; $2\text{-}l\sim 2\text{-}n$ are multipliers; $3\text{-}l\sim 3\text{-}n$ are PN code generators; $4\text{-}l\sim 4\text{-}n$ are BPSK modulators; and 5 is an adder.

In the transmitter inputted high speed data (A) are converted into parallel data sets (B1), (B2), . . . and (Bn) by the serial-parallel convertor 1. Each of the parallel data sets (B1), (B2), . . . and (Bn) is inputted to one of the inputs of each of the multipliers 2-1, 2-2, . . . and 2-n. On the other hand, each of PN codes (C1), (C2), . . . and (Cn) different from each other outputted by the PN code generators 3-1, 3-2, . . . and 3-n, respectively, is inputted to the other input of each of the multipliers 3-1, 3-2, . . . and 3-n. Outputs (D1), (D2), . . . and (Dn) of the multipliers 2-1, 2-2, . . . and 2-n are inputted to the BPSK modulators 4-1, 4-2, . . . and 4-n, respectively, to modulate a high frequency carrier signal (E). In this way high frequency signals (F1), (F2), . . . and (Fn) are outputted by the BPSK modulators 4-1, 4-2, . . . and 4-n, respectively, to be inputted to the adder 5. Finally a multiplexed speed spectrum signal (G) is outputted by the adder 5 to be transmitted.

FIG. 7 represents a receiver, in which $7\text{-}l\sim 7\text{-}n$ are convolvers; $8\text{-}l\sim 8\text{-}n$ are multipliers; $9\text{-}l\sim 9\text{-}n$ are PN code generators; $10\text{-}l\sim 10\text{-}n$ are detectors; and 12 is a data demodulator.

In the receiver described above a received signal (H) is distributed to be inputted to one of the inputs of each of the convolvers 7-1, 7-2, . . . and 7-n.

On the other hand, each of PN codes (K1), (K2), . . . and (Kn) outputted by the PN code generators 9-1, 9-2, . . . and 9-n is applied to one of the inputs of each of the multipliers 8-1, 8-2, . . . and 8-n, respectively. On the other hand, a high frequency carrier signal (L) is inputted to the other input of each of the multipliers 8-1, 8-2, . . . and 8-n. Each of outputs (I1), (I2), . . . and (In) of the multipliers 8-1, 8-2, . . . and 8-n is applied to the other input of each of the convolvers 7-1, 7-2, . . . 7-n, respectively.

Outputs (J1), (J2), . . . and (Jn) of the convolvers are inputted to the detectors 10-1, 10-2, . . . and 10-n, respectively. At this time a correlation spike is generated in each of the outputs of the convolvers with a same timing for every data channel. Outputs (M1), (M2), . . . and (Mn) of the detectors 10-1, 10-2, . . . and 10-n are inputted to the data demodulator 12. Reproduced data (N) are outputted by the data demodulator 12.

The prior art multiplex communication device described above has drawbacks that synchronization of the carrier signal is necessary and that it requires a plurality of convolvers (or matched filters) serving as correlators.

OBJECT OF THE INVENTION

Therefore the object of the present invention is to remove the drawback that the prior art multiplex communication device requires a plurality of correlators and to provide a multiplex communication device capable of demodulate inputted signals by using a single correlator.

SUMMARY OF THE INVENTION

In order to achieve the above object, a spread spectrum communication device according to the present invention consists of a transmitter comprising means for converting serial transmission data into a plurality of parallel data sets; spread-spectrum-modulating means for spread-spectrum-modulating the plurality of parallel data sets; and means for synthesizing a multiplexed spread-spectrum-modulated signal to output it by combining a spread-spectrum-modulated signal outputted by the spread-spectrum-modulating means and a spread-spectrum-modulated signal independent of the transmission data; and a receiver comprising a correlator for correlating the multiplexed spread-spectrum-modulated signal with a reference signal; correlation pulse generating means for generating a correlation pulse by converting an output of the correlator into a signal in a base band information band, which is further converted into binary pulses; detecting means for detecting a correlation pulse component corresponding to the spread-spectrum-modulated signal independent of the transmission data from the correlation pulse; sampling pulse generating means for generating a sampling pulse from the correlation pulse component thus detected; and information reproducing means for reproducing the data, based on the sampling pulse from the correlation pulse coming from the correlation pulse generating means.

BRIEF DESCRIPTION OF THE DRAWINGS

FIGS. 9a and 9b are diagrams showing an example of sure data sampling methods;

DETAILED DESCRIPTION

Figure 1A:
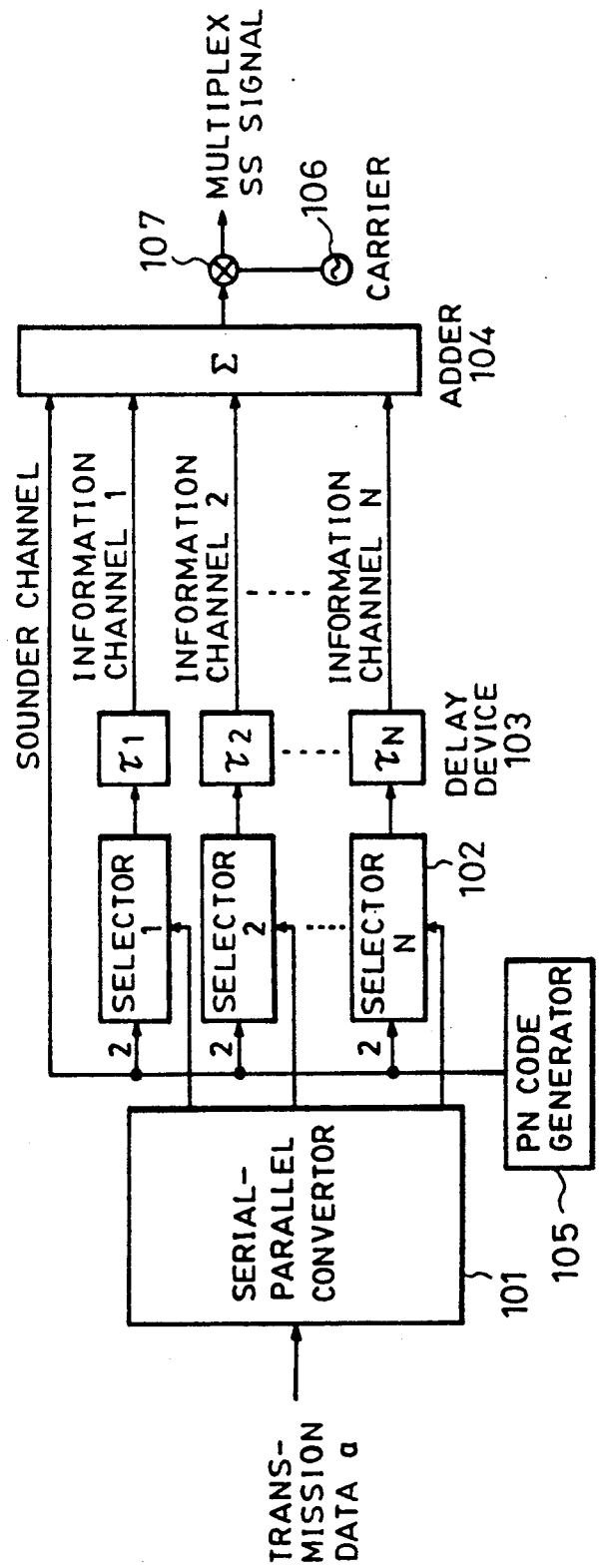
FIGS. 1a and 1b are block diagrams showing an embodiment of the transmitter and the receiver, respectively, of a device according to the present invention.

Hereinbelow the present invention will be explained, referring to the embodiments indicated in the drawings.

Figure 1B:
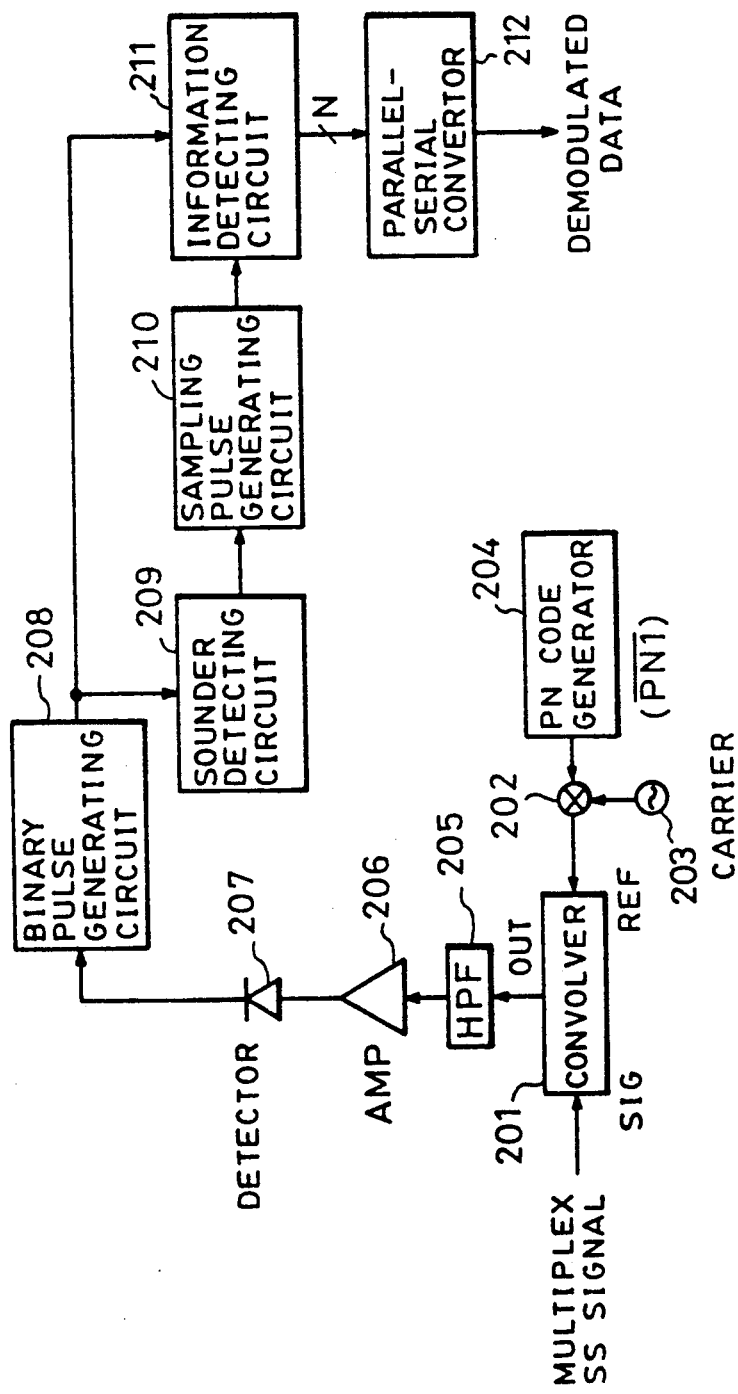

FIGS. 1a and 1b represent the transmitter and the receiver, respectively, constituting an embodiment of the spread spectrum (SS) communication device according to the present invention.

As indicated in FIG. 1a, the transmitter is composed of a serial-parallel converting circuit 101, a group of selectors 102, a group of delay devices 103, an adder 104, a PN code generator 105, a high frequency carrier generator 106 and a multiplier 107.

As indicated in FIG. 1b, the receiver is composed of a convolver 201 serving as a correlator, a multiplier 202, a high frequency carrier generator 203, a PN code generator 204, a high pass filter (HPF) 205, an amplifier 206, a detector 207, a binary pulse generating circuit 208, a sounder pulse detecting circuit 209, a sampling pulse generating circuit 210, an information detecting circuit 211 and a parallel-serial converting circuit 212.

Now the operation of the embodiment described above will be explained. At first, in the transmitter, transmission data a are converted into signals in a plurality of channels by the serial-parallel converting circuit 101. Here, for the sake of simplifying the explanation, it is supposed that the number of channels is N. Further the transmission data a are converted into the signals so that each output has a lower transmission speed. For example they are converted into parallel data having a transmission speed of 1/N or another transmission speed, which is arbitrarily lower than the transmission speed of the transmission data a. Spread spectrum modulation (SS modulation) is effected in accordance with the polarity of the signal in each channel from the serial-parallel converting circuit 101.

The SS modulation is effected e.g. according to either one of two following systems.
1. CSK (Code Shift Keying) system: System, by which either one of two kinds of PN codes (PN1) and PN2) is selected to be outputted according to the polarity of data (signal).
2. OOK (On Off Keying) system: System, by which it is selected according to the polarity of data (signal) whether a PN code (PN1) should be outputted or not.

Figure 3:
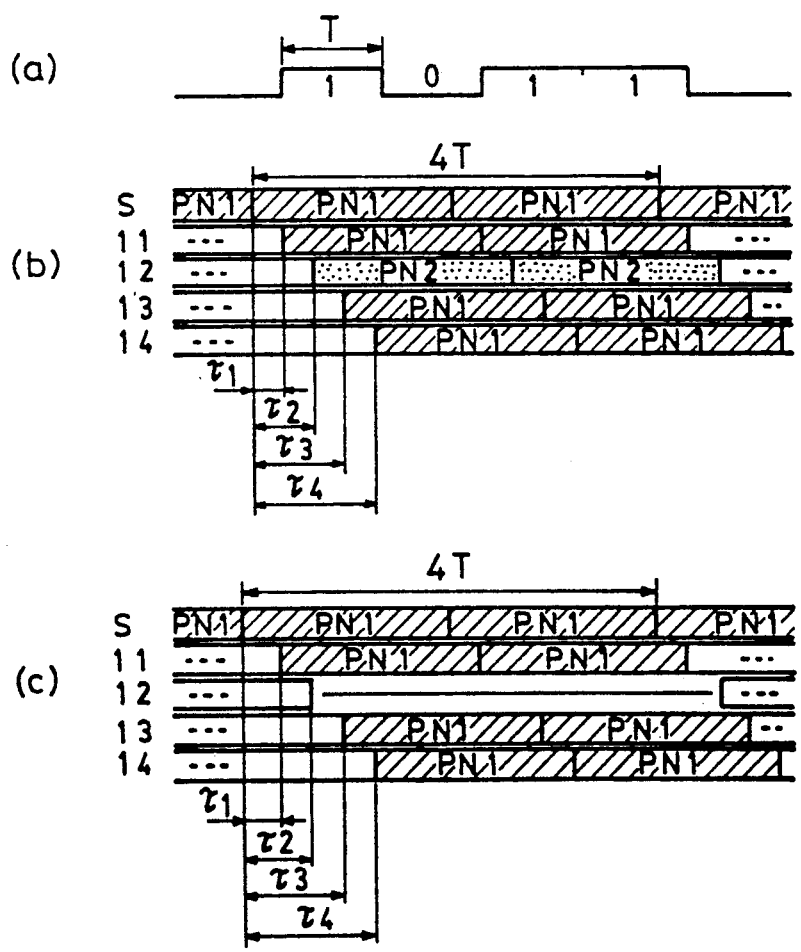
FIGS. 3(a)-3(c) are a diagram for explaining the operation of the transmitter stated above.

In order to realize the SS modulation operation according to the two systems described above, the spread spectrum modulator is constructed by the PN code generator 105 for generating the PN codes (PN1 and PN2) and the group of selectors 102 for effecting the selection described previously according to each of the output of the serial-parallel converting circuit 101. Next the output of each of the selectors in the spread spectrum modulator is inputted to each of the delay devices in the group of delay devices 103. Each of the SS modulated signals (information channels), for which arbitrary delay amounts different from each other are set, using the phase of the PN code (here it is supposed to be PN1) of the sounder channel serving as a synchronizing signal for data demodulation, is obtained, starting from the output of each of the delay devices. This aspect is indicated in FIG. 3. FIG. 3 represents differences between the CSK system (b) and the OOK system (c) for different delay amounts ($\tau_1 \sim \tau_4$), in the case where there are four information channels $11 \sim 14$, in which S represents the sounder channel. Further it represents that the transmission speed of the transmission data (a) is transformed into lower transmission speeds of the information channels. Here it is transformed into a transmission speed of $\frac{1}{4}$. N SS modulated signals of the information channels obtained from the different delay devices and the signal of the sounder channel are added in the analogue manner (multiplexing operation) in the adder 104. The output of the adder 104 is multiplied by the output of the high frequency carrier generator in the multiplier 107 to obtain a multiplexed SS signal.

Now, in the receiver, the multiplexed SS signal obtained in the transmitter is inputted to one of the input terminals of the convolver 201 as the received signal.

On the other hand, a high-frequency-modulated PN code obtained by multiplying a PN code obtained by the PN code generator 204 (here a PN code (PN1), which is in the inverted relation in time with respect to the PN code (PN1) used in the transmitter, is used) by the output of the high frequency carrier generator 203 in the multiplier 202 is inputted to the other input terminal of the convolver as the reference signal.

Figure 4:
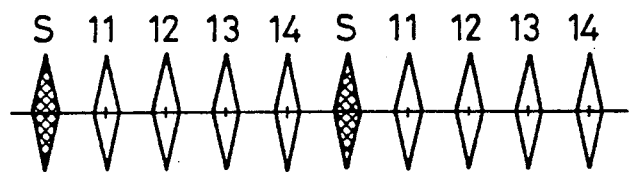
FIG. 4 is a diagram for explaining the operation of the receiver stated above.

The convolver 201 carries out correlation operation of the received signal and the reference signal to obtain a high frequency correlation output (refer to FIG. 4). In this explanation the gate length of the convolver (processing time) corresponds to 2T.

In FIG. 4, correlation peaks are obtained, which correspond to the different PN codes of the different information channels, which are in different phase relations, by using the phase of the PN code of the sounder channel explained, referring to FIG. 3, as the reference.

Here a state is indicated, where correlation peaks representing self-correlations are obtained for the sounder channel and all the information channels.

Consequently, in the case where no self-corelation can be obtained for either one of the CSK system and the OOK system (CSK system . . . mutual correlation, OOK system . . . no correlation), no correlation peak is produced.

Although, in the above embodiment, the case where convolvers are used for correlators is described, there is no problem, even if matched filters are used instead thereof.

However the place where the reference signal is produced is replaced by patterns on the matched filters and therefore it is unnecessary.

Then the output of the convolver is detected by the detector 207 through the high pass filter 205 and the amplifier 206 to be transformed into a signal in the base band information and a logic level pulse train is obtained by the binary pulse generating circuit 208.

In the binary pulse generating circuit 208 a threshold level is set so that the correlation peak can be separated from the spurious level in the optimum manner.

Since the correlation output corresponding to the sounder channel produces the correlation peaks always periodically, the correlation peak is detected by the sounder pulse detecting circuit 209 to obtain the reference time signal.

The reason why such a time signal serving as the reference is necessary is to make the spread spectrum code synchronization in the usual DS-SS system unnecessary.

That is, the present invention doesn't relate to a system, by which data are reproduced by effecting the phase synchronization between the PN code of the received signal and the PN code of the reference signal on the convolver, but realizes an asynchronous system, in which a mere code synchronization process is omitted.

The sampling pulse generating circuit 210 produces a sampling pulse for sampling a correlation output corresponding to each of the information channels on the basis of the reference time signal, which is the output of this sounder pulse detecting circuit 209.

In the case where a convolver is used for the correlator, since the received signal and the reference signal inputted in the convolver correspond to each other, the correlation peak is produced at the gate delay time/2. That is, in this way, the correlation outputs corresponding to the delay amounts ($\tau_1 \sim \tau_r$) of the different information channels with respect to the phase of the PN code of the sounder channel on the transmitter side indicated in FIG. 3 are produced, separated in time by about $\tau_1/2 \sim \tau_4/2$.

Consequently the sampling pulses are produced, taking the property described above into account. In this way the information detecting circuit 211 reproduces a data train for each of the information channels by sampling the correlation output corresponding to the relevant information channel on the basis of the sampling pulse.

The data obtained here are those having a transmission speed equal to the lower transmission speed after the serial-parallel conversion on the transmitter side.

Then the transmission data are reproduced by converting N parallel data trains thus obtained into serial data in the parallel-serial converting circuit 212.

Figure 5:
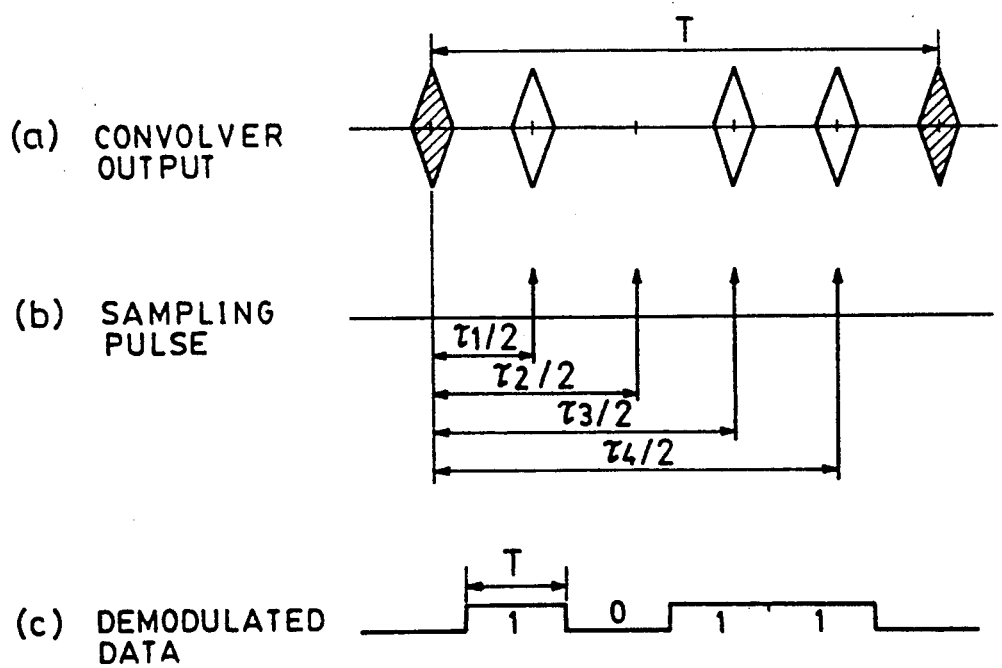
FIGS. 5(a)-5(c) are another diagram for explaining the operation of the receiver stated above.
Figure 6:
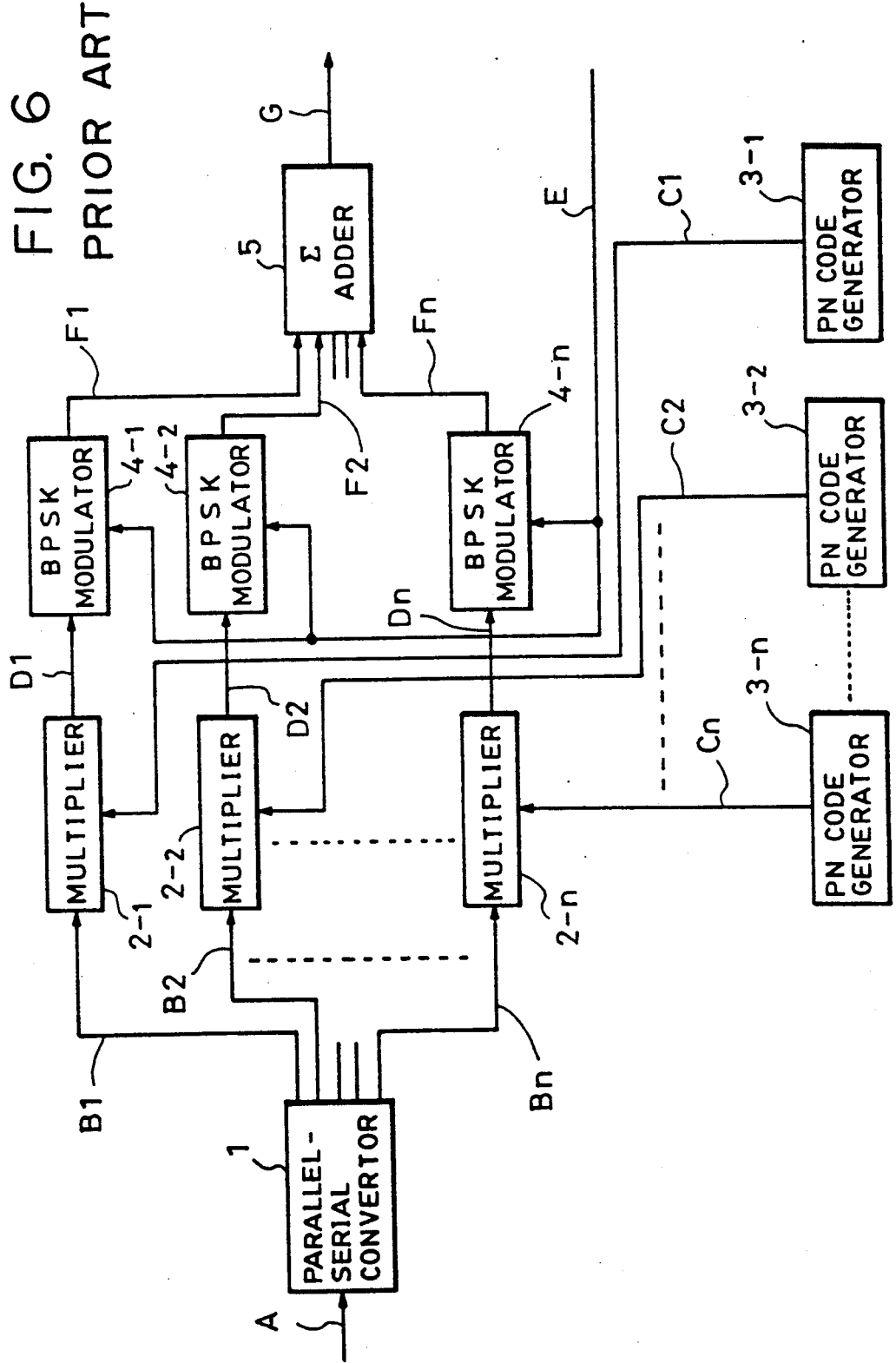
FIG. 6 is a block diagram showing an example of the transmitter of a prior art device.
Figure 7:
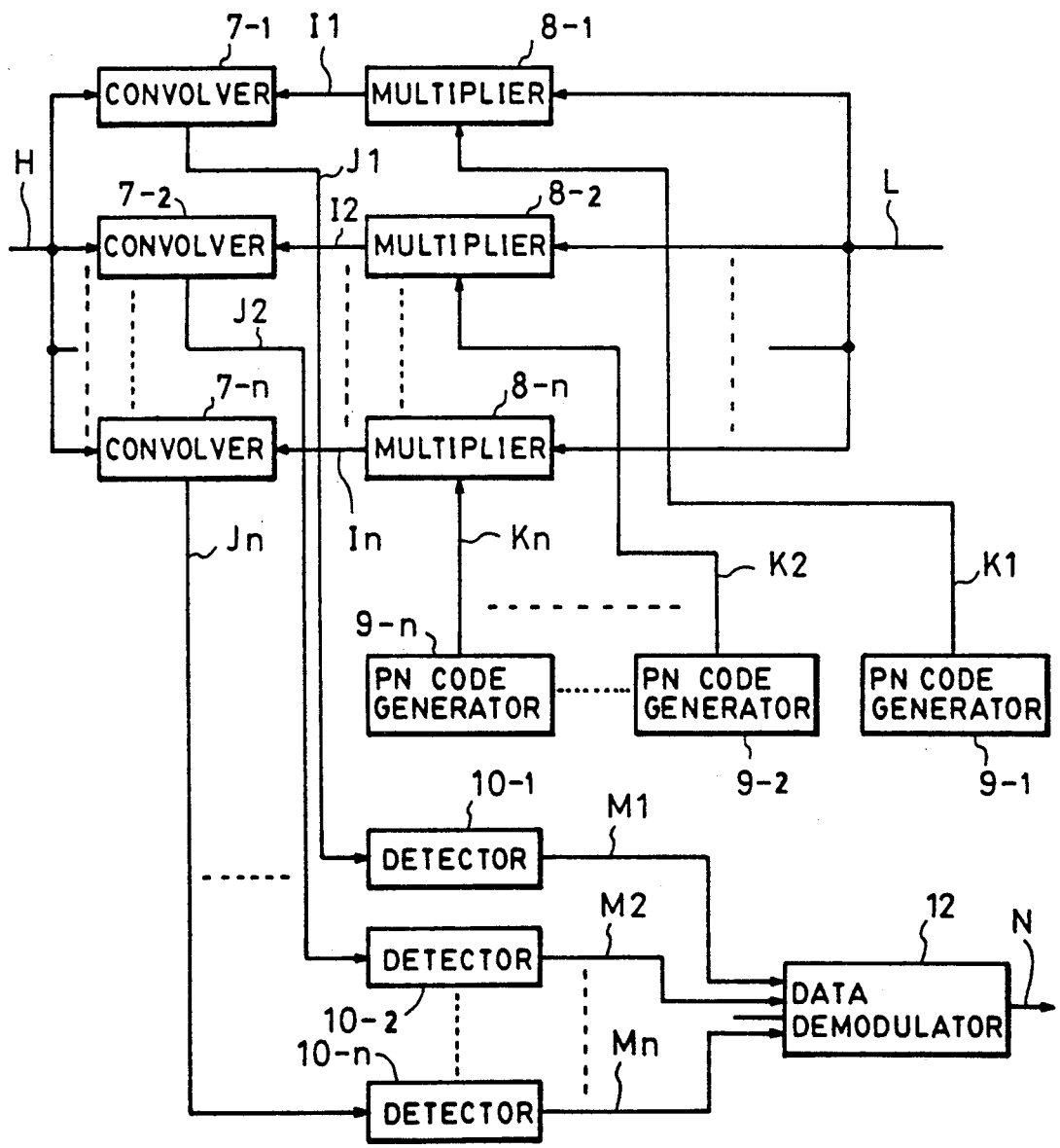
FIG. 7 is a block diagram showing an example of the receiver of the prior art device.

The outline of this series of operations is indicated in FIG. 5.

As described above, in the receiver, correlation operation is carried out by the correlator. The correlation output thus obtained id detected and converted into binary pulses to obtain a logic level correlation pulse train. The correlation pulse component corresponding to the sounder channel is detected from the correlation pulse train signal by the sounder detecting circuit and such a detection of the correlation pulse component of the sounder channel serving as the reference signal for the information channels can be said to be an initial synchronizing process in a broad sense. Next a concrete example of the sounder detecting circuit will be explained.

In the transmitter the PN code of the sounder channel is set so that the correlation output corresponding to the sounder channel is produced always periodically. For example, PN1 described previously is set successively. In this way it is possible to detect the sounder by utilizing the periodicity that the correlation output is produced always periodically.

Figure 8:
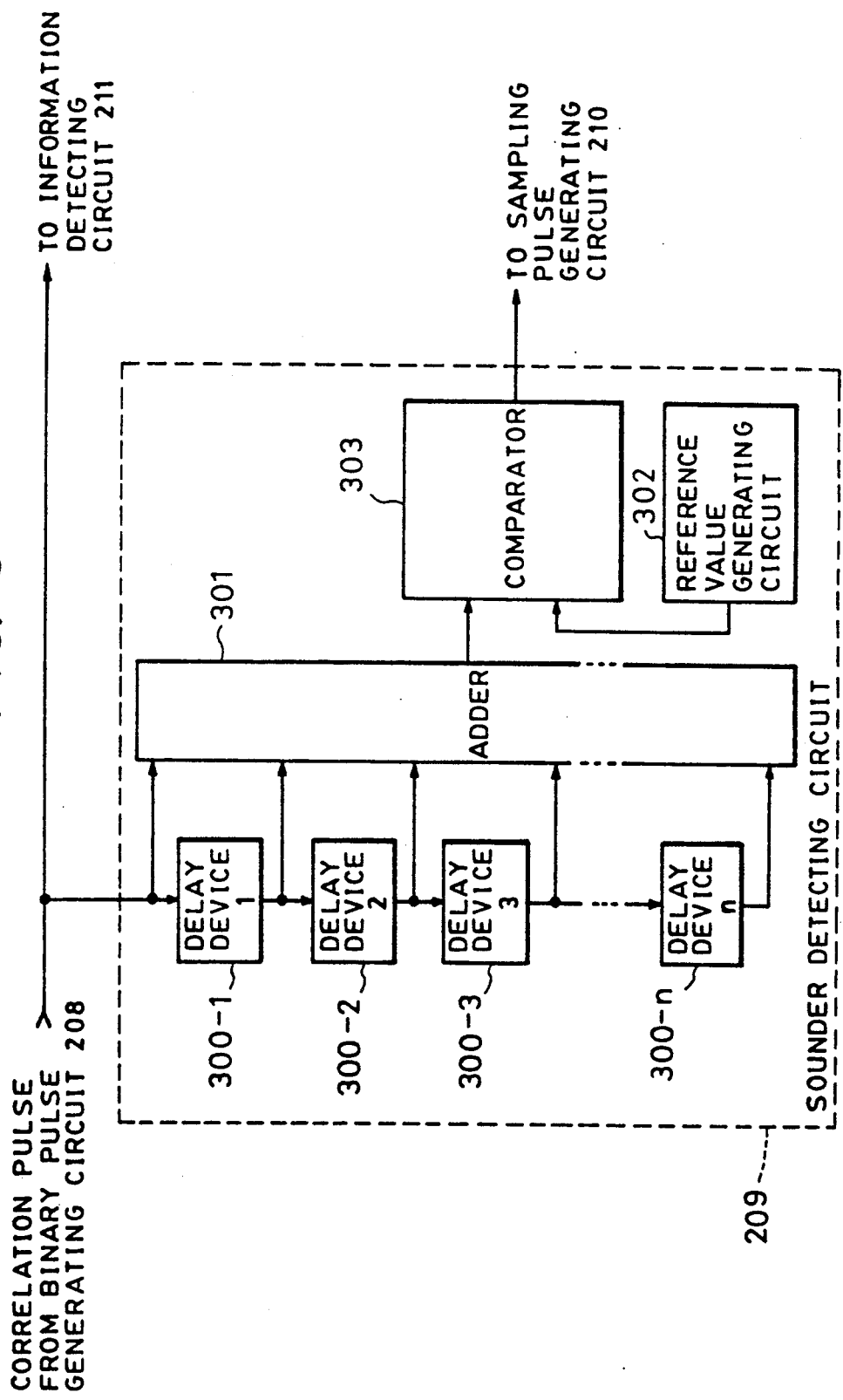
FIG. 8 is a block diagram indicating an example of the construction of a sounder detecting circuit.

FIG. 8 indicates an example of the construction of the sounder detecting circuit, in which 300-$l$_300-$n$ are delay devices; 301 is an adder; 302 is a reference value generating circuit; and 303 is a comparator.

As described previously, supposing that the period of generation of the correlation pulse component corresponding to the sounder channel is known, delay times of the different delay devices 300-$l$_300-$n$ are set so as to be in accordance with that period and the outputs of the different delay devices 300-$l$_300-$n$ are added by the adder 301 in an analogue manner. In this way the number of pulses at that time for every period of generation of the correlation pulse component is obtained. For example, when there are 4 delay devices, the greatest number of pulses, which can be detected, is 5.

The output of the adder 301 is compared with the reference value (5) from the reference value generating circuit 302 by the comparator 303. The output signal from the comparator 303 is obtained, when they are in accordance with each other. In the case where this signal has been obtained, it is judged that periodical signals have been inputted, i.e. the sounder pulse has been detected. Although the signal judgment precision can be improved by increasing the number of stages of the delay devices described above, the number of stages is properly determined, taking the circuit scale or the use environment into account.

As described above, the output signal of the comparator 303 stated above is transmitted to the sampling pulse generating circuit and information is reproduced by sampling the correlation pulses corresponding to the different information channels by using sampling pulses obtained by the sampling pulse generating circuit.

When the multiplexed SS signal is obtained in the transmitter at the sounder detection described above, in the case where the transmission data are data, in which 1s succeed one after another, i.e. in the case where the multiplexed SS signal is obtained to be outputted in the form, in which PN1s are outputted successively in the SS modulation, the correlation pulses corresponding to the different information channels in the outputs of the correlators stated above are produced successively and periodically similarly to the sounder channel. In this case it is possible for the sounder pulse detecting circuit to give a detection judgment both for the correlation pulses corresponding to the sounder channel and for those corresponding to the information channels.

As the result, in the case where the sounder channel has not been able to be detected for either one of the information channels, the correlation pulses corresponding to the information channels cannot be sampled or erroneous data are reproduced.

In order to solve this problem, following methods (a) and (b) are known.

(a) When data to be transmitted (information) are produced, only the sounder channel is outputted, as indicated in FIG. 9a, before the transmission data are multiplexed to output a multiplexed SS signal. The transmission period is supposed to be sufficient only for detecting the correlation pulse component corresponding to the sounder channel by the sounder detecting circuit.

Figure 10:
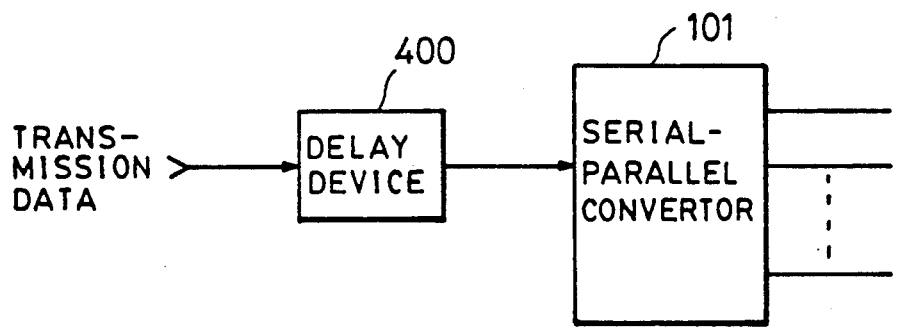
FIG. 10 is a block diagram showing an example of the construction for realizing this method.

In this case, if there is no high level handshake between the side inputting data in the transmitter, i.e. the side, where the data to be transmitted are produced (e.g. when communication between different personal computers concerns, a personal computer), and the transmitter, a delay device 400 is disposed in the stage succeeding the serial-parallel converting circuit, as indicated in FIG. 10 so that the data to be transmitted (information) are delayed from the beginning of the generation of the correlation pulse by the transmission period thereof.

Figure 9B:
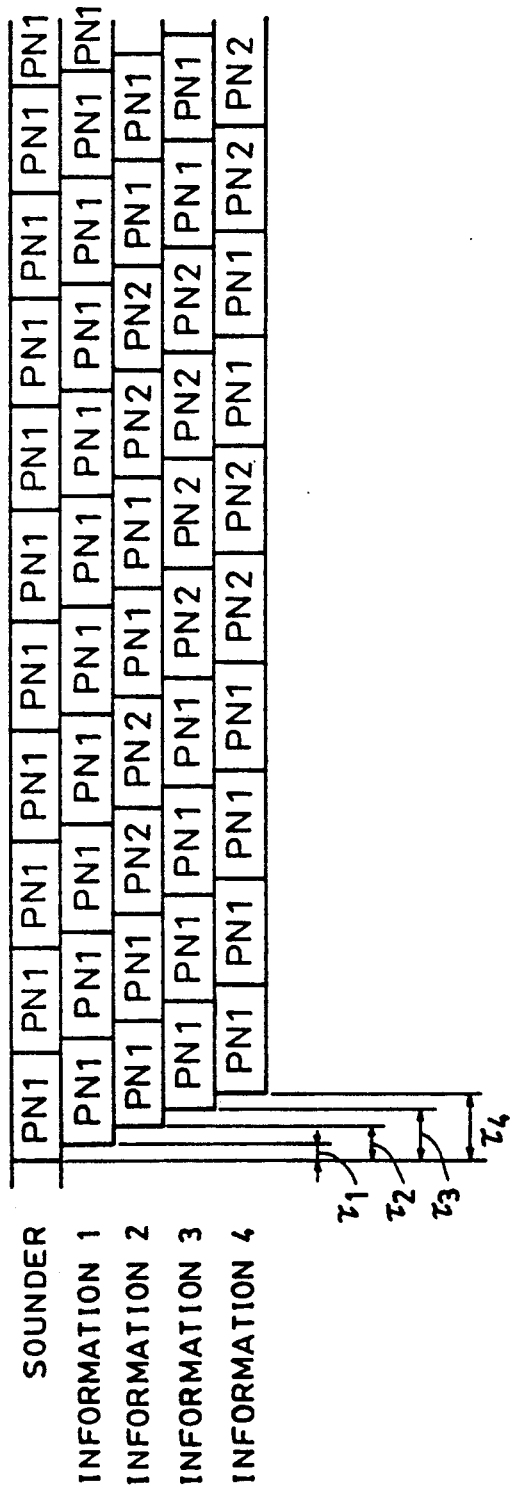

(b) When data to be transmitted (information) are produced, as indicated in FIG. 9b, the transmission data are coded and multiplexed in the transmitted to output a multiplexed SS signal. As this coding method, a method, by which 0s are inserted here and there in the transmission data, in which 1s succeed one after another, according to a predetermined algorithm, etc. are used so that the correlation pulse corresponding to the sounder channel can be surely detected by the sounder detecting circuit. Since 1s don't succeed one after another in this way, erroneous detections can be removed in the sounder detecting circuit.

Figure 11A:
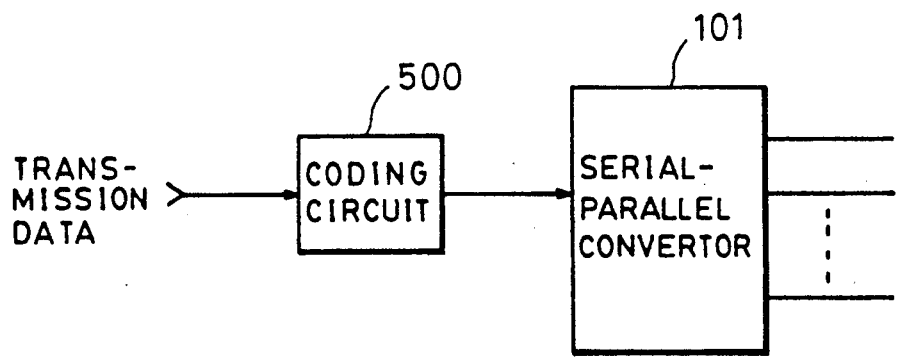
FIGS. 11a and 11b are block diagrams showing other examples of the construction for realizing this method.
Figure 11B:
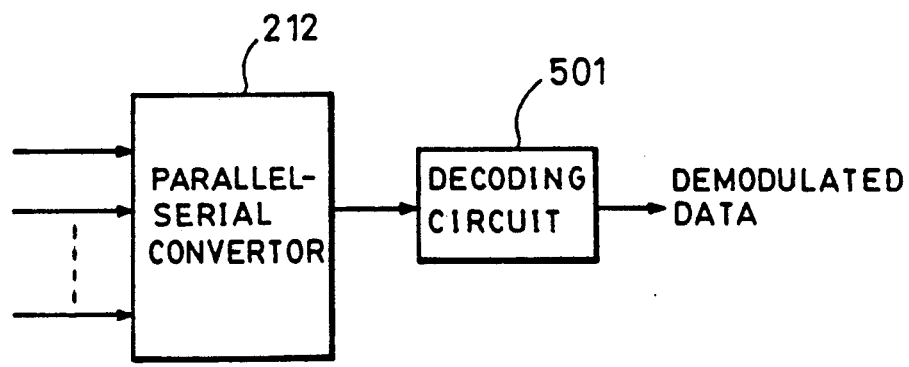

In the data reproduction in the receiver, the transmission data are decoded, before they are reproduced to be outputted. That is, contrarily to the processing on the transmitter side, the coded transmission data are restored by removing the inserted 0s according to the predetermined algorithm. An example of the construction of the principal parts of the transmitter and the receiver in this case are indicated in FIGS. 11a and 11b.

In these figures, 500 is a coding circuit and 501 is a decoding circuit. The construction of the other parts is identical to those indicated in FIGS. 1a and 1b.

The sounder detection described above makes the spread spectrum code synchronization in the usual DS-SS system unnecessary. That is, it is devised in order to realize an asynchronous system. Consequently, in this case, the correlation peak should be surely outputted by the convolver. For this reason, it is necessary that the information channels should be longer than the gate length of the convolver. That is, the gate length (processing time) of the convolver corresponds to 2T (T representing the transmission data transmission speed). Consequently for each of the information channels it is preferable that the transmission speed of the transmission data is transformed into a transmission speed lower than twice thereof (e.g. ¼). In this way, a plurality of (e.g. 4) correlation peaks are produced by the convolver for every bit of each of the information channels. However, in reality, since the level of the correlation peak at a variation point of data is undetermined, in the case where the procedure described above is executed, it is necessary to detect a sure correlation peak point in 1 bit length of the information channel data.

As a method for detecting such a sure correlation peak point, a method, by which variation points of data are recognized to be avoided, may be adopted. That is, in the case where the data are "0", although no correlation outputs are produced at the variation points of the data directly preceding and succeeding it, outputs having some levels are produced. Consequently, when data to be transmitted are produced, arbitrary dummy data having an information channel length and variation points of data for making it possible to detect optimum points are transmitted. Since these dummy data are subjected also to the serial-parallel conversion similarly to the usual data, the dummy data are loaded on either one of the information channels of the multiplexed SS signal finally obtained and in the receiver only that channel is observed and detected.

In this case the dummy data should be transmitted before the transmission data, taking the number of multiplex into account so as to form an alternate pattern, e.g. 1, 0, 1, 0, 1, 0, ..., etc. in one of the information channels.

Figure 2A:
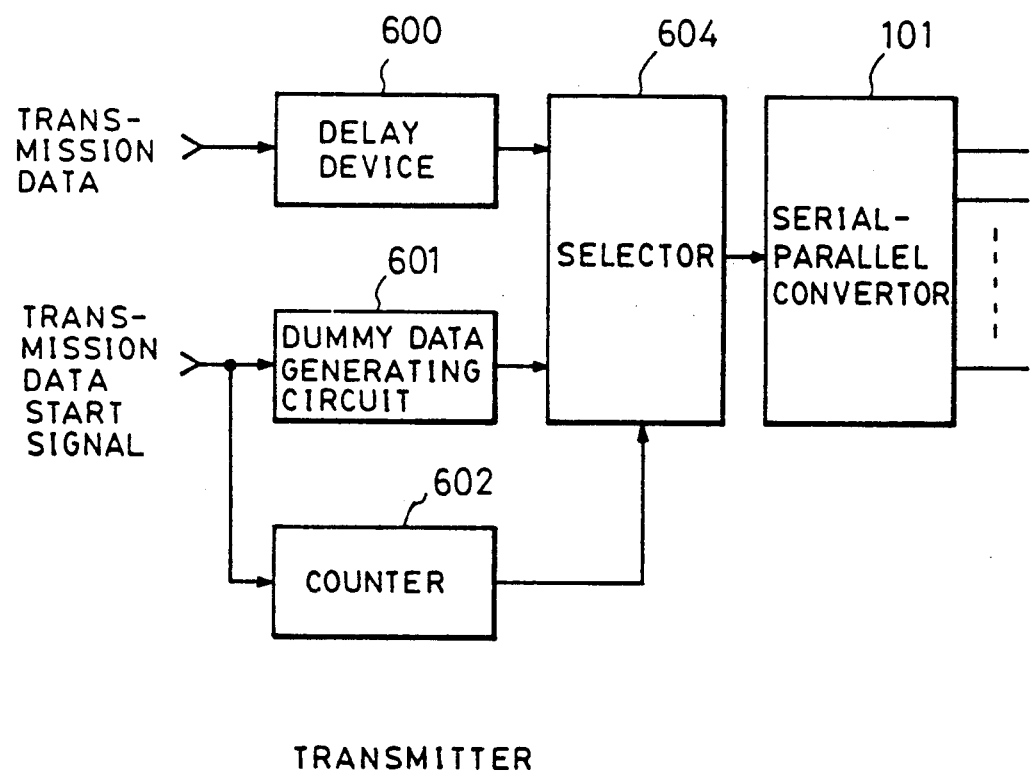
FIGS. 2a and 2b are block diagrams showing another embodiment of the transmitter and the receiver, respectively, of a device according to the present invention.
Figure 2B:
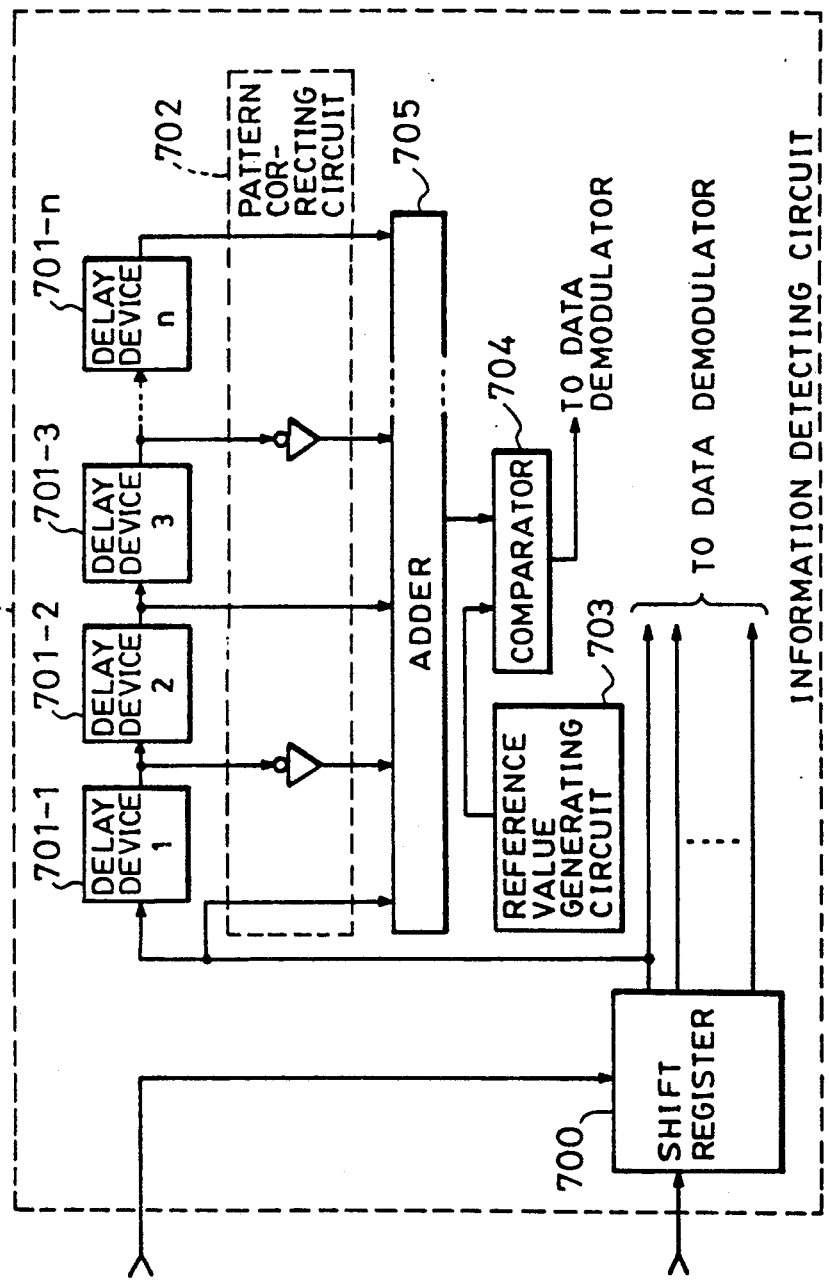

FIGS. 2a and 2b represent an example of the construction of the principal parts of the transmitter and the receiver, respectively, in the case where the method described above for detecting the correlation peak points is adopted.

In FIG. 2a, 600 is a delay device; 601 is a dummy data generating circuit; 602 is a counter (or delay device) having a same delay device as the delay device stated above; and 604 is a selector. The construction succeeding the selector is one indicated in FIG. 1a or one of obtained by adding the circuit indicted in FIG. 10 or FIG. 11a thereto.

FIG. 2b indicates an example of the construction of the information detecting circuit 211 in the transmitter, in which 700 is a shift register; 701-1, 701-2, 701-3, ... 701-n are delay devices; 702 is a pattern correcting circuit; 703 is a reference value generating circuit; 704 is a comparator; and 705 is an adder. The pattern correcting circuit 702 includes e.g. inverters INV1 and INV2.

In the transmitter indicated in FIG. 2a, e.g. in the case where the number of multiplex for the information is 4, dummy data 1000000010000000 ... generated by the dummy data generating circuit 601 are inputted before the transmission data by the selector 604, responding to a transmission data start signal to obtain the multiplex SS signal through the SS convertor, etc. after the serial-parallel conversion. Since the serial transmission data to be transmitted are delayed by the delay device 600 during the dummy data transmission period by a same time as that period, no problem is produced and the selector 604 switches its output from the dummy data to the transmission data, responding to the output of the counter, after the lapse of that period.

In the receiver indicated in FIG. 2b, the correlation pulses from the binary pulse generating circuit 208 are sampled by sampling pulses by means of the shift register 700. A correlation pulse corresponding to one of the information channels of the correlation pulses is inputted to the delay devices 701-1, 701-2, ... 701-n. The delay time of these delay devices is set so as to be equal to the information channel length.

The outputs of the different delay devices are added by the adder 705 through the pattern correcting circuit 702 in an analogue manner. Since in the pattern correcting circuit 702 an alternate pattern, which is e.g. 101010 ..., inverters INV1, INV2 are disposed for every two delay devices. In this way, at a suitable point, the pattern of 101010 ... is transformed into a unipolar pattern such as 111111 .... Therefore, when the final output of the comparison with the reference value by means of the comparator 704 is obtained, it represents the optimum point of the data, i.e. the point suitable for reproducing the data by sampling.

Although any dummy pattern may be used, inverters in the pattern correcting circuit of the receiver are set, depending on the dummy pattern. However the dummy pattern length should be longer than the longest delay time in the group of delay devices 701, i.e. it should be sufficiently long to be detected Next another embodiment of the present invention will be explained.

Figure 12:
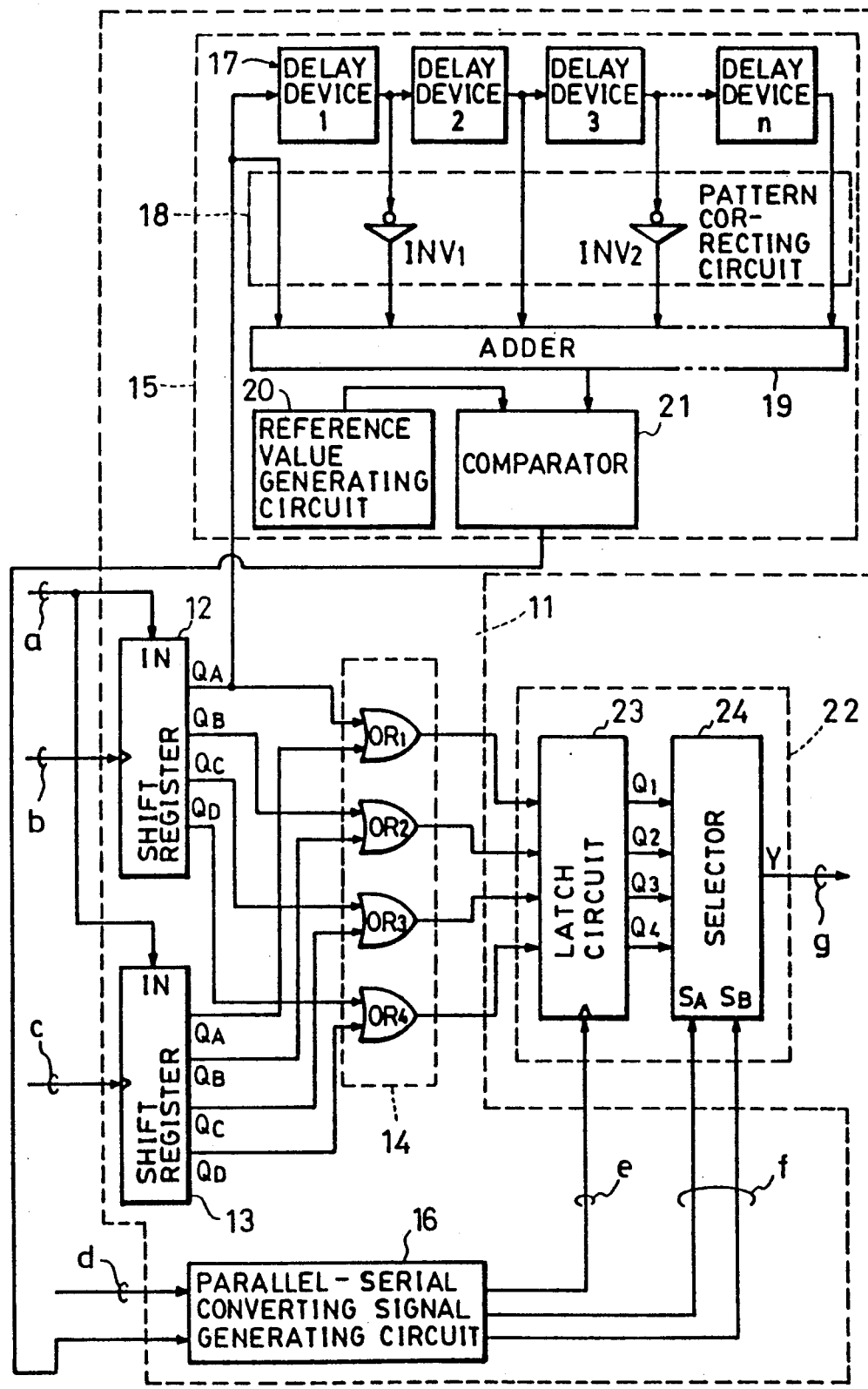
FIG. 12 is a block diagram showing an example of the construction of information detecting means and parallel-serial converting means used in a spread spectrum receiver according to the present invention.
Figure 16:
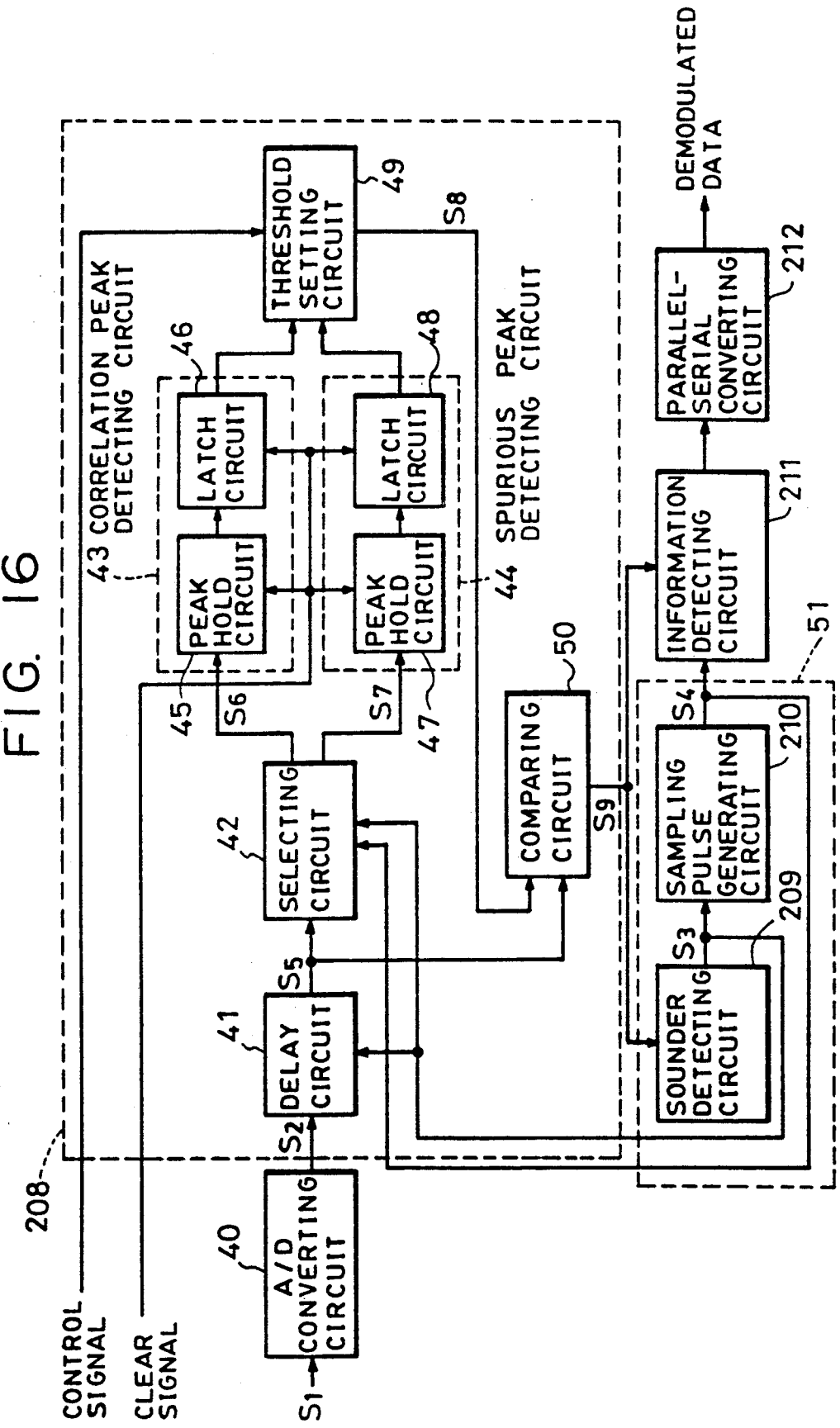
FIG. 16 is a block diagram showing an example of the construction of a binary pulse generating circuit used in the spread spectrum receiver according to the present invention.

FIG. 12 indicates an embodiment of the information detecting means 11 and the parallel-serial converting means 22 corresponding to the information detecting circuit 211 and the parallel-serial converting circuit 212 indicated in FIG. 16 described previously, constituting the principal part of the spread spectrum receiver according to the present invention and the other construction is identical to that described previously.

The information detecting means 11 consists of shift registers 12 and 13 constituting first and second serial-parallel converting means; a group of OR circuits 14; a correlation peak point detecting circuit 15; and a latch and parallel-serial converting signal generating circuit 16.

The correlation peak point detecting circuit 15 is provided with a group of delay devices 17; a pattern correcting circuit 18 including inverters INV1 and INV2; an adder 19; a reference value generating circuit 20; and a comparator 21 so as to detect sure correlation peak points in a one-bit length of the information channel data to output a data detecting signal.

The parallel-serial converting means 22 is provided with a latch circuit 23 and a selector 24. The latch circuit 23 is controlled by a latch signal e from the circuit 16 described above, while the selector 24 is controlled by a parallel-serial converting signal f.

Figure 13:
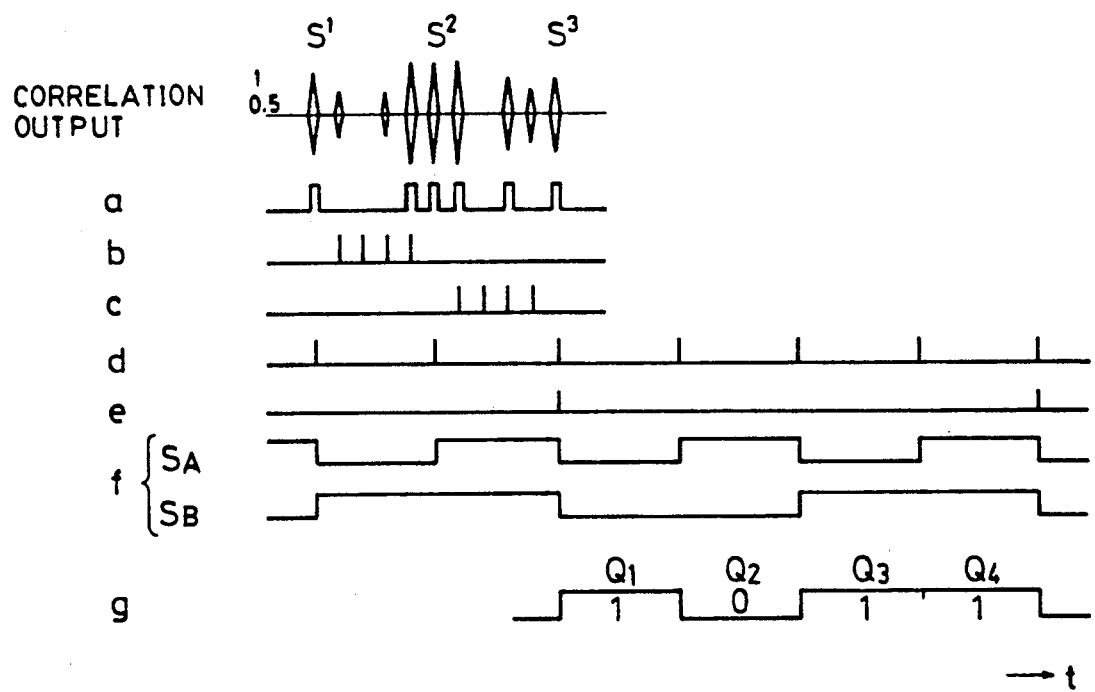
FIGS. 13(a)-13(g) are a timing chart for explaining the operation of the device indicated in FIG. 12.

FIG. 13 is a timing chart for explaining the operation of the embodiment described above, in the case where the transmission data are 1, 0, 1, 1, in which a represents correlation pulses; b first information sampling pulses; c second information sampling pulses; d sounder sampling pulses; and g reproduced data.

Next the operation of the embodiment described above will be explained.

At first, correlation pulses a corresponding to the transmission data are inputted to the shift register 12, responding to sampling pulses (first information sampling pulses b), which sample sure correlation peak points in a one-bit length of he information channel data obtained from the sampling pulse generating circuit after the sounder pulse detection.

Next correlation outputs for the succeeding period, which are sure correlation peak points in a one-bit length of the information channel data, are inputted to the shift register 13 by the second information sampling pulses identical to the first information sampling pulses delayed by about the gate length/2 of the convolver. Then parallel outputs $QA \sim QD$ and $QA' \sim QD'$ of the shift registers 12 and 13, respectively, are inputted to the group of OR circuits 14 to form respective logic sums.

This is done for effecting reproduction of the information by using sure correlation peak points and correlation peaks produced in the succeeding period, because a plurality of correlation peaks from the convolver are produced in a one-bit length of each of the information channels. This is due to the fact that, as indicated in FIG. 2, even if the amplitude of correlation peaks of sure correlation peak points is decreased by e.g. multipath fading, etc. or they disappear, no problem is produced in the data reproduction, if the degree of influences is small in the succeeding period. That is, if correlation due to interference is weak in each of the periods, the transmission data can be reproduced surely without error.

Thereafter the transmission data g are reproduced by the parallel-serial converting means from the output of the group of OR circuit 14 by using a latch signal e generated by the circuit 16 on the basis of the sounder sampling pulse d and the output signal (data detection signal) of the detecting circuit detecting the sure correlation peak points in a one-bit length of the information channel data and a parallel-serial converting signal f.

Figure 14:
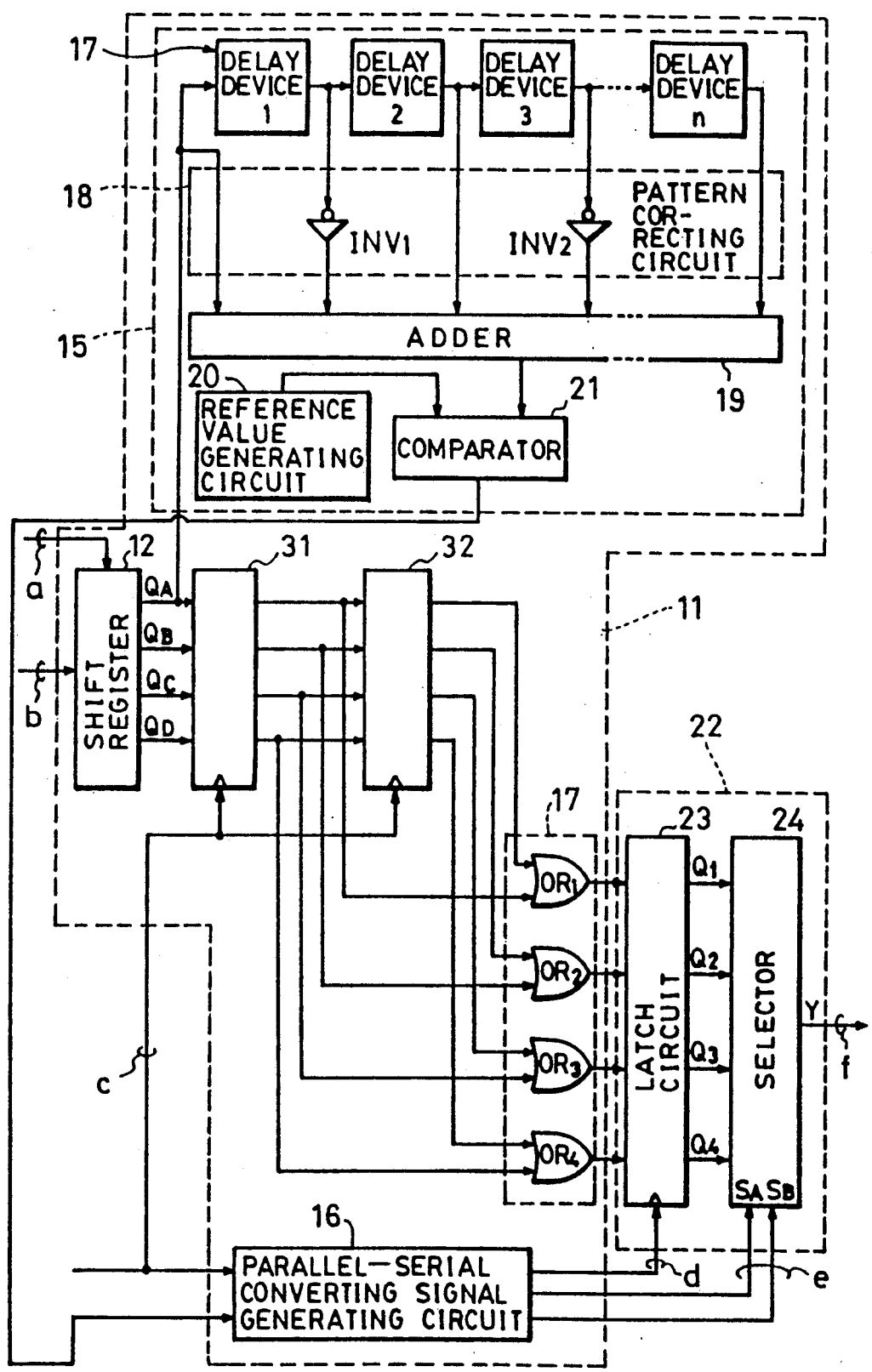
FIG. 14 is a block diagram showing a modified example of the device indicated in FIG. 12.

FIG. 14 represents the principal part of another embodiment of the present invention, in which the reference numerals identical to those used in FIG. 12 indicate same or analogous circuits, and the shift register 13 described previously is replaced by latch circuits 31 and 32, which are controlled by sounder sampling pulses c.

Figure 15:
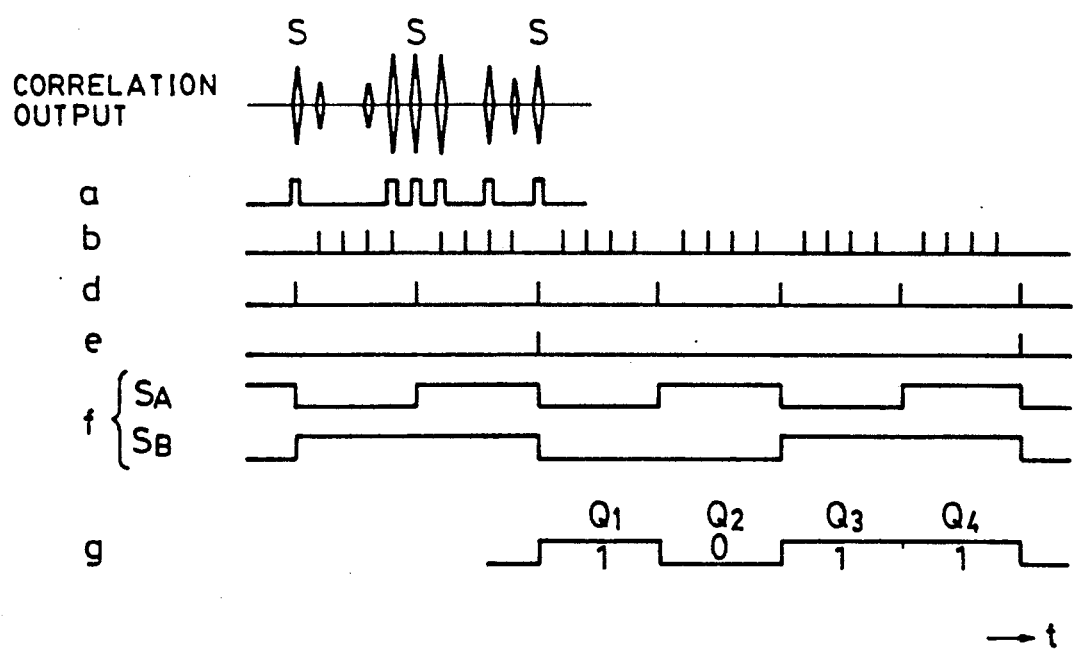
FIGS. 15(a)-15(g) are a timing chart for explaining the operation of the device indicated in FIG. 14.

FIG. 15 is a time chart for explaining the operation of the embodiment stated above.

In the embodiment indicated in FIG. 14, the correlation pulses corresponding to the transmission data are inputted to the shift register 12 by sampling pulses b obtained by the sampling pulse generating circuit after the sounder pulse detection.

Then they are inputted to the latch 31 and the latch 32 one after another by sounder sampling pulses d. Thereafter a logic sum of the outputs of the latches is formed by the group of OR circuits 14. In this way an effect similar to that obtained by the embodiment indicated in FIG. 12.

The transmission data can be reproduced by effecting the succeeding processing in the same way as the embodiment indicated in FIG. 12 described above.

The transmission data g are reproduced by the parallel-serial converting means by using the latch signal e generated on the basis of the sounder sampling pulse and the output signal (data detection signal) of the detecting circuit 15 detecting sure correlation peak points in a one-bit length of the information channel data and the parallel-serial converting signal f.

In the two embodiments described above, it is supposed that the section, for which the logic sum is formed, is two periods (corresponding to the gate length of the convolver), where the sure correlation peak point and the correlation peak produced in the succeeding period are produced. This is due to the fact that it is supposed as an example that the transmission speed of the sounder and the information channels is equal to ¼ of the transmission speed of the transmission data. Consequently, if the transmission speed of the sounder and the information channels is made further lower with respect to the transmission speed of the transmission data, it is possible to elongate the section, for which the logic sum is formed, which contributes to improvement of data demodulation characteristics.

As clearly seen from the above explanation, according to the embodiments indicated in FIGS. 12 and 14, error rate of the reproduced data in the multiplexed spread spectrum receiver using a single correlator is lowered and the data demodulation characteristics are improved.

Figure 17:
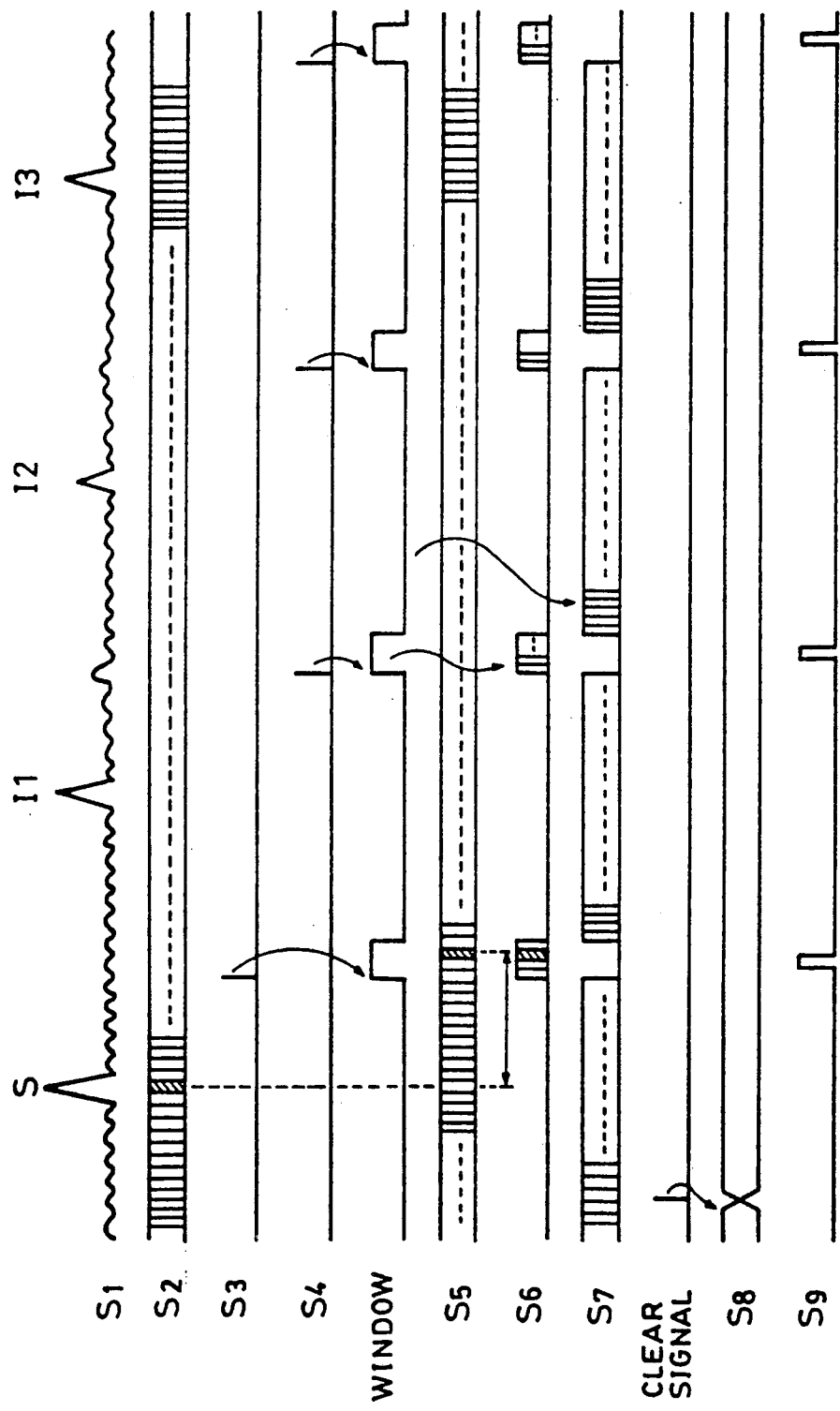
FIG. 17 is a timing chart for explaining the operation of the circuit indicated in FIG. 16.

FIG. 16 represents an embodiment of the binary pulse generating circuit used in the spread spectrum receiver according to the present invention and FIG. 17 is a timing chart of signals in different parts of the circuit.

In FIG. 16, the reference numerals identical to those used in FIG. 1b represent same or analogous circuits and the binary pulse generating circuit 208 consists of a delay circuit 41, a selecting circuit 42, a correlation peak detecting circuit 43, a spurious peak detecting circuit 44, a threshold setting circuit 49 and a comparing circuit 50. The correlation peak detecting circuit 43 includes a peak hold circuit 45 and a latch circuit 46 and on the other hand the spurious peak detecting circuit 44 includes a peak hold circuit 47 and a latch circuit 48. On the input side of the delay circuit 41 there is disposed an A/D converting circuit 40, while on the output side of the comparing circuit 50 there is disposed a control signal generating section 51. The control signal generating section 51 consists of e.g. a sounder detecting circuit 209 and a sampling pulse generating circuit 210.

Next the operation of the embodiment described above will be explained.

In order to effect data demodulation by digital signal processing, the correlation output detected by the detector is converted from an analogue signal into a digital signal of N bits (N: integer) by the A/D converting circuit 40.

The A/D converted correlation output signal is inputted to the delay circuit 41. The delay circuit 41 delays the signal, which is the inputted correlation output on the basis of a reference time signal obtained by detecting the correlation pulse corresponding to the sounder channel by the sounder detecting circuit 209.

That is, the control whether the signal, which is the correlation output, should be delayed or not is effected around the sounder detection. (The detail thereof will be explained later.)

The reference time signal (i.e. the sampling pulse corresponding to the correlation pulse of the sounder channel) obtained by the sounder detecting circuit 209 is produced successively time sequencially. However, since the control around the sounder detection in the delay circuit 41 is effected in a binary manner, no problem is produced in the operation, if the first reference signal is obtained in a triggering manner.

Then the correlation output signal is inputted to the selecting circuit 42 through the delay circuit 41. In the selecting circuit 22, all the correlation output signals, which have passed through the delay circuit 41, are inputted to the correlation peak detecting circuit 43, until the sounder channel is detected. Further, when the sounder channel is detected, the place, where the correlation peak corresponding to the information channel is produced, is known and the sampling pulse corresponding to the correlation peak of that information channel is formed in the sampling pulse generating circuit 210.

Therefore the selecting circuit 42 after the sounder channel detection produces a window having a reference time width of the output of the sounder detecting circuit 209 to select the correlation output signal to output it. The inside of the window is a section, where there exist the sounder and the correlation peaks of the information channels, and the outside of the window is a section, where there exist spurious peaks other than those correlation peaks.

That is, after the sounder channel has been detected, the selecting circuits effects the operation classifying the correlation peaks and the spurious peaks, depending on whether they are inside or outside of the window.

Now the operation of the delay circuit 41 will be explained supplementally. In the selecting circuit 42, at classifying the correlation peak component and the spurious component after the sounder channel detection, until the window information, by which the output of the sounder detecting circuit 209 and the output of the sampling pulse generating circuit 210 should be selected, is obtained, there exists processing time due to a system from the output of the selecting circuit 42 to that point. Since this is a kind of a feedback system, in the case where the window is formed, delay corresponding to the processing time is produced. In the case where the window is formed, the correlation output signal should be suitably inputted so that the correlation peak component is inputted within the window and on the contrary the spurious component is inputted outside of the window. Consequently delay compensation of the correlation output signal after the sounder channel detection is effected in the delay circuit 41.

As described above, the selecting circuit 42 inputs all the correlation output signals to the correlation peak detecting circuit 43 before the sounder channel detection and inputs the signals to the correlation peak detecting circuit 43 for the section, where there exist correlation peaks and to the spurious peak detecting circuit 44 for the section, where there exist spurious peaks by means of the window.

Further, in the above description, on the side of the terminal, through which no correlation outputs are outputted from the selecting circuit 42, the selecting circuit 42 is so driven that digital values of n bits, which is smallest, are outputted during that period of time.

Next the signal, which has passed through the selecting circuit 42, is inputted to the correlation peak detecting circuit 43 and the spurious peak detecting circuit 44.

Each of the peak detecting circuits detects and holds the maximum value of the output signal of the selecting circuit 22 by means of each of the peak hold circuits 45 and 47. When the maximum values obtained by the peak hold circuits are moved by using a clear signal as a trigger, the maximum values hold by the peak hold circuits are cleared at the same time. Further, here, the pulse period of the clear signal can be set arbitrarily. For example, when it is set so as to be equal to the gate processing signal of the correlator used in the receiver, in the case where the correlator is a matched filter, the peak hold operation is effected for every period of the correlation peak and in the case where the correlator is a convolver, it is effected for every two periods. Owing to such a construction, the peak detection can be effected in an arbitrary time section and therefore even if variations are produced in the amplitude of the correlation output in a short period of time, it is possible to follow them.

Then the maximum value held by the latch circuit 46 or 48 of each of the peak detecting circuit is inputted to the threshold setting circuit 49. In the threshold setting circuit, operating processing is effected on the basis of each of the obtained maximum values to calculate the threshold value.

There are various calculating methods. As a example thereof it is supposed here that the maximum value obtained by the correlation peak detecting circuit is Vs; the maximum value obtained by the spurious peak detecting circuit 24 is Vn; and the calculated threshold value is Vt. Then, $$Vt = Vn + (Vs - Vn/a) \qquad (1)$$

can be obtained. The obtained threshold value is a digital signal of N bits.

In the case where the weight for the second term of the right member is 2, the threshold is set at the middle point between the correlation peak and the spurious peak.

It is possible also to give the weight described above from the exterior as a control signal. In this case, the control signal is generated e.g. by CPU, etc.

Then the threshold value obtained by the threshold setting circuit 49 is inputted to the comparing circuit 50.

The comparing circuit 50 compares the correlation output signal, which has passed through the delay circuit, with the threshold value and when a correlation output signal greater than the threshold value is inputted, a correlation pulse is generated.

The above description will be explained supplementally as follows. Before the sounder channel is detected, the maximum value is detected from all the correlation output signals to obtain the threshold value and processing for producing the correlation pulse is effected. When the sounder channel is detected, the precision of the correlation pulse detection is increased and the data demodulation having a small number of errors can be realized by trying to separate the correlation peak from the spurious peak and by setting a suitable threshold.

Further, although after the output of the detector an A/D conversion is effected for carrying out digital signal processing and as the result digital signal processing is effected also in the binary pulse generating circuit, it is clear to be able to realize easily the same process, also in the case where analogue signal processing is effected.

As explained above, according to the binary pulse generating circuit described above, no erroneous detection due to spurious peaks is produced from the correlation output signal by adopting the construction as described above and it is possible to obtain surely the correlation pulse corresponding to the correlation peak. Further, even if variations are produced in the amplitude of the correlation output, satisfactory response can be obtained.

As explained above, according to the present invention, also when the spread spectrum communication is multiplexed, a single correlator is sufficient and therefore it is possible to simplify the circuit.

Although, in the case where a convolver or a matched filter is used for the correlator, the upper limit of the transmission rate of data, which can be dealt with, is determined by the processing time of the correlator, data transmission can be effected at a high speed over that limit.

In addition, even if a high speed data transmission is effected, since it is not necessary to increase the clock rate of the PN code, the communication band is not widened and no interference with other communication systems is produced.

Furthermore, since spread-spectrum modulated signals independent of data are multiplex-modulated as a reference time signal, phase synchronization of the PN code in the correlator is unnecessary and therefore a high speed data transmission is made possible without taking processing relaxation in the correlation into account. Still further, since it is possible to detect surely the correlation pulse corresponding to the sounder channel serving as the reference at the data demodulation and at the same time it is possible to detect sure data sampling points, data demodulation characteristics are improved.

What is claimed is:

1. A spread spectrum communication device comprising:
    a transmitter which includes:
        means for converting serial transmission data into a plurality of parallel data sets;
        spread-spectrum-modulating means for spread-spectrum-modulating said plurality of parallel data sets; and
        means for synthesizing and outputting a multiplexed spread-spectrum-modulated signal by combining a spread-spectrum-modulated signal outputted by said spread-spectrum-modulating means and a spread-spectrum-modulated signal independent of said transmission data; and
    a receiver which includes:
        a correlator for correlating said multiplexed spread-spectrum-modulated signal with a reference signal;
        correlation pulse generating means for generating a correlation pulse by converting an output of said correlator into a signal in a base band information band, which is further converted into binary pulses;
        detecting means for detecting a correlation pulse component corresponding to said spread-spectrum-modulated signal independent of said transmission data from said correlation pulse;
        sampling pulse generating means for generating a sampling pulse from said correlation pulse component thus detected; and
        information reproducing means for reproducing said data, based on said sampling pulse from said correlation pulse coming from said correlation pulse generating means.

2. A spread spectrum communication device according to claim 1 wherein said detecting means includes a plurality of delay devices; an adder, which adds outputs of said delay devices in an analogue manner; and a comparator for comparing an output of said adder with a reference value.

3. A spread spectrum communication device according to claim 1 wherein there is disposed in said transmitter a delaying means for delaying said data by a predetermined period of time, before said serial transmission data are converted into said plurality of parallel data sets.

4. A spread spectrum communication device according to claim 1 wherein there is disposed in said transmitter coding means for coding said data according to a predetermined algorithm, before said serial transmission data are converted into said plurality of parallel data sets, and there is disposed in said receiver a decoding means for reproducing said serial transmission data by decoding reproduced data at said data demodulation.

5. A spread spectrum communication device according to claim 1 wherein there are disposed in said transmitter a delaying means for generating arbitrary dummy data and means for outputting selectively said transmission data or said dummy data and there is disposed in said receiver dummy data detecting means for detecting said dummy data from said correlation pulse.

6. A spread spectrum communication device according to claim 5 wherein said dummy data detecting means includes a plurality of delay devices, each of which delays the correlation pulse corresponding to each of information channels; pattern correcting means for correcting different outputs of said delay devices; an adder for adding outputs of said pattern correcting means in an analogue manner; and a comparator for comparing an output of said adder with a reference value.

7. A spread spectrum communication device according to claim 1 wherein said sampling pulse generating means generates first sampling pulses consisting of a plurality of pulses having a predetermined period, which sample correlation peak points in a one-bit length of information channel data, based on a signal detected by said detecting means, and second sampling pulses including a plurality of pulses delayed by a predetermined time with respect to said first sampling pulses, and said information reproducing means comprises:

first serial-parallel converting means for serial-parallel converting said correlation pulse, based on said first sampling pulses;

second serial-parallel converting means for serial-parallel converting said correlation pulse, based on said second sampling pulses;

operating means for forming a logical sum of outputs corresponding to each other of said first and said second serial-parallel converting means; and parallel-serial converting means for converting an output of said operating means.

8. A spread spectrum communication device according to claim 1 wherein said sampling pulse generating means generates first sampling pulses including a plurality of pulses having a predetermined period, which sample correlation peak points in a one-bit length of information channel data, based on a signal detected by said detecting means, and second sampling pulses including a plurality of pulses delayed by a predetermined time with respect to said first sampling pulses, and said information reproducing means comprises:

serial-parallel converting means for serial-parallel converting said correlation pulse, based on said sampling pulse;

first latching means for storing an output of said serial-parallel converting means, based on a signal detected by said detecting means;

second latching means for storing an output of said first latching means, based on said signal detected by said detecting means;

operating means for forming a logical sum of outputs of said first and said second latching means; and parallel-serial converting means for converting an output of said operating means.

9. A spread spectrum communication device according to claim 1 wherein said correlation pulse generating means comprises:

a delaying circuit for making the correlation output signal in a delayed state or in a non-delayed state, depending on presence or absence of a control signal;

a selecting circuit for classifying output signals of said delaying circuit during a predetermined time interval into signals in a correlation output time and those in a non-correlation output time;

a correlation peak detecting circuit, to which said signals in the correlation output time are supplied and which holds the greatest value thereof for said predetermined time interval;

a spurious peak detecting circuit, to which said signals in the non-correlation output time are supplied and which holds the greatest value thereof for said predetermined interval;

a threshold value setting circuit, to which a signal held by said correlation peak detecting circuit and that held by said spurious peak detecting circuit are inputted for each said predetermined time interval and which executes operating processing, based on the greatest value of the signals thus obtained;

a comparing circuit, to which an output signal of said delaying circuit and an output signal of said threshold value setting circuit are supplied and which compares these output signals with each other to output a correlation pulse; and control signal generating means for generating said control signal, based on said correlation pulse.

* * * * *

UNITED STATES PATENT AND TRADEMARK OFFICE
CERTIFICATE OF CORRECTION

PATENT NO. : 5,228,055
DATED : July 13, 1993
INVENTOR(S) : Yoshitaka UCHIDA et al It is certified that error appears in the above-identified patent and that said Letters Patent is hereby corrected as shown below:

Column 14, line 60; change "consisting of" to ---including---.

Signed and Sealed this

Thirtieth Day of May, 1995

Attest:

BRUCE LEHMAN

Attesting Officer            Commissioner of Patents and Trademarks